US006185470B1

(12) United States Patent
Pado et al.

(10) Patent No.: US 6,185,470 B1
(45) Date of Patent: *Feb. 6, 2001

(54) NEURAL NETWORK PREDICTIVE CONTROL METHOD AND SYSTEM

(75) Inventors: Lawrence E. Pado; Peter F. Lichtenwalner, both of St. Charles, MO (US)

(73) Assignee: McDonnell Douglas Corporation, St. Louis, MO (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/966,327

(22) Filed: Nov. 7, 1997

(51) Int. Cl.[7] .......................... G06F 19/00; G05B 13/02
(52) U.S. Cl. ........................ 700/104; 700/49; 706/23
(58) Field of Search ........................ 468/10; 395/22; 475/15; 700/47, 48, 49, 44, 104; 706/15, 23, 25, 26, 903, 904

(56) References Cited

U.S. PATENT DOCUMENTS

| 3,794,817 | 2/1974 | Shinskey | 235/150.1 |
|---|---|---|---|
| 4,358,822 | 11/1982 | Sáchez | 364/151 |
| 5,197,114 | 3/1993 | Skeirik | 395/22 |
| 5,311,421 | 5/1994 | Nomura et al. | 364/157 |
| 5,704,011 | * 12/1997 | Hansen et al. | 706/23 |
| 5,832,468 | * 11/1998 | Miller et al. | 706/23 |
| 5,909,676 | * 6/1999 | Kano | 706/25 |

OTHER PUBLICATIONS

Draeger, A., Engell, S., and Ranke, H., Model Predictive Control Using Neural Networks, IEEE Control Systems, Oct. 1995, pp. 61–66.

Lichtenwalner, P.F., Little, G.R., and Scott, R.C., Adaptive Neural Control of Aeroelastic Response, Proceedings of the SPIE 1996 Symposium on Smart Structures and Materials, San Diego, CA 1996.

Pado, L.E., Damle, R.D. (1996), Predictive Neuro Control of vibration in Smart Structures, 1996 SPIE Smart Structures, 1996 SPIE Smart Structures and Materials Conference.

Litchenwalner, P.F., Little, G.R., Pado, L.E., and Scott, R.C., Adaptive Neural Control for Active Flutter Suppression, ASME 1996 IMEC&E Conference Proceedings, Atlanta, GA, Nov. 1996.

\* cited by examiner

*Primary Examiner*—Albert De Cady
*Assistant Examiner*—Shelly A Chase
(74) *Attorney, Agent, or Firm*—Senniger, Powers, Leavitt & Roedel

(57) ABSTRACT

A method and system for controlling a dynamic nonlinear plant. An input signal controls the plant and an output signal represents a state of the plant in response to the received input signal. A memory stores input and output signals corresponding to m consecutive past states of the plant. A computer neural network predicts a set of future output states representative of the output signal corresponding to the next n consecutive future states of the plant in response to a set of trial control inputs. The trial control inputs represent the input signal corresponding to the next n consecutive future states of the plant. The neural network predicts the future output states based on the past input and output signals and the future trial control inputs. A processor generates the trial control inputs and determines a performance index, indicative of plant performance over time in response to the trial control inputs, as a function of the future output states. The processor generates the input signal for controlling the plant and modifies it as a function of the trial control inputs so that the performance index reaches a desired value.

20 Claims, 3 Drawing Sheets

NEURAL NETWORK PREDICTIVE CONTROL METHOD AND SYSTEM

TECHNICAL FIELD

The present invention relates generally to systems and methods for providing adaptive control of a dynamic system or structure and, more particularly, to a neural network based predictive controller.

BACKGROUND ART

Many dynamic, nonlinear systems exist which need adaptive forms of control. As an example, vibration and undesirable aeroelastic responses adversely affect various flexible structures (e.g., an aircraft wing). In turn, these adverse effects shorten the lifespans and increase the acquisition and maintenance costs of such structures. Thus, an active control system is desired for reducing vibration, alleviating buffet load and suppressing flutter of aircraft structures, providing adaptive hydraulic load control, reducing limit cycle oscillations of an aircraft store and the like.

U.S. Pat. Nos. 3,794,817, 4,358,822, 5,197,114 and 5,311,421, the entire disclosures of which are incorporated herein by reference, describe conventional controllers. In general, conventional adaptive control algorithms work almost entirely in the linear domain. Although U.S. Pat. No. 3,794,817 teaches a nonlinear adaptive controller, it requires that specific system knowledge about, for example, nonlinear deadband regions, be included for the controller to function.

Model-based predictive control systems, while sometimes adaptive, are generally linear and work with relatively large time constants (greater than one second). U.S. Pat. No. 4,358,822 discloses a typical adaptive predictive controller for use in a chemical process. In this instance, the controller is a linear adaptive model predictive controller with an eight minute time constant. Conventional controllers of this type generally use state space models for predicting future states.

Although some conventional controllers use neural networks as part of their control algorithm, such controllers typically include a separate controller in addition to the neural network. For example, U.S. Pat. No. 5,311,421 discloses such a process control method and system in which a neural network estimates certain parameters which are then used by a separate controller. Another use of neural networks in control systems is to learn control signal outputs from a conventional control algorithm or from a human operator as in U.S. Pat. No. 5,197,114.

Use of a neural network within a model predictive control scheme has been demonstrated but only for systems with relatively large time constants, such as controlling pH in a neutralization reactor.

For these reasons, a nonlinear adaptive controller which is not system specific and which learns nonlinearities in a neural network is desired. Further, such a controller is desired which has a relatively fast time constant of about one millisecond or faster and which does not need to copy the actions of another controller which must first be developed.

DISCLOSURE OF THE INVENTION

The invention meets the above needs and overcomes the deficiencies of the prior art by providing an improved system and method for adaptively controlling highly dynamic systems such as reducing undesirable vibration and undesirable aeroelastic responses associated with flexible structures such as aircraft wings. This is accomplished by a neural network adaptive controller which provides improved control performance over that of a conventional fixed gain controller. Such a neural network adaptive controller uses online learning neural networks to implement an adaptive, self-optimizing controller. In addition, such system is economically feasible and commercially practical and such method can be carried out efficiently and economically.

Briefly described, one embodiment of the invention is directed to a method of controlling a dynamic nonlinear plant. An input signal controls the plant and an output signal represents a state of the plant in response to the received input signal. The method includes the steps of storing the input and output signals corresponding to m consecutive past states of the plant and generating a set of trial control inputs. The trial control inputs represent the input signal corresponding to the next n consecutive future states of the plant. The method also includes predicting a set of future output states with a computer neural network. The future output states represent the output signal corresponding to the next n consecutive future states of the plant in response to the trial control inputs and are predicted based on the past input and output signals and the future trial control inputs. The method further includes determining a performance index as a function of the future output states. In this embodiment, the performance index is indicative of plant performance over time in reponse to the trial control inputs. The method also includes the step of modifying the input signal as a function of the trial control inputs for controlling the plant so that the performance index reaches a desired value.

A system embodying aspects of the invention includes a memory storing input and output signals corresponding to m consecutive past states of a plant to be controlled. A computer neural network predicts a set of future output states representative of the output signal corresponding to the next n consecutive future states of the plant in response to a set of trial control inputs. The trial control inputs represent the input signal corresponding to the next n consecutive future states of the plant. In this embodiment, the neural network predicts the future output states based on the past input and output signals and the future trial control inputs. The system also includes a processor for generating the input signal for controlling the plant. The processor generates the trial control inputs and determines a performance index, indicative of plant performance over time in response to the trial control inputs, as a function of the future output states. The processor also modifies the input signal as a function of the trial control inputs for controlling the plant so that the performance index reaches a desired value.

Other objects and features will be in part apparent and in part pointed out hereinafter.

BRIEF DESCRIPTION OF DRAWINGS

Corresponding reference characters indicate corresponding parts throughout the drawings.

BEST MODES FOR CARRYING OUT THE INVENTION

Figure 1:
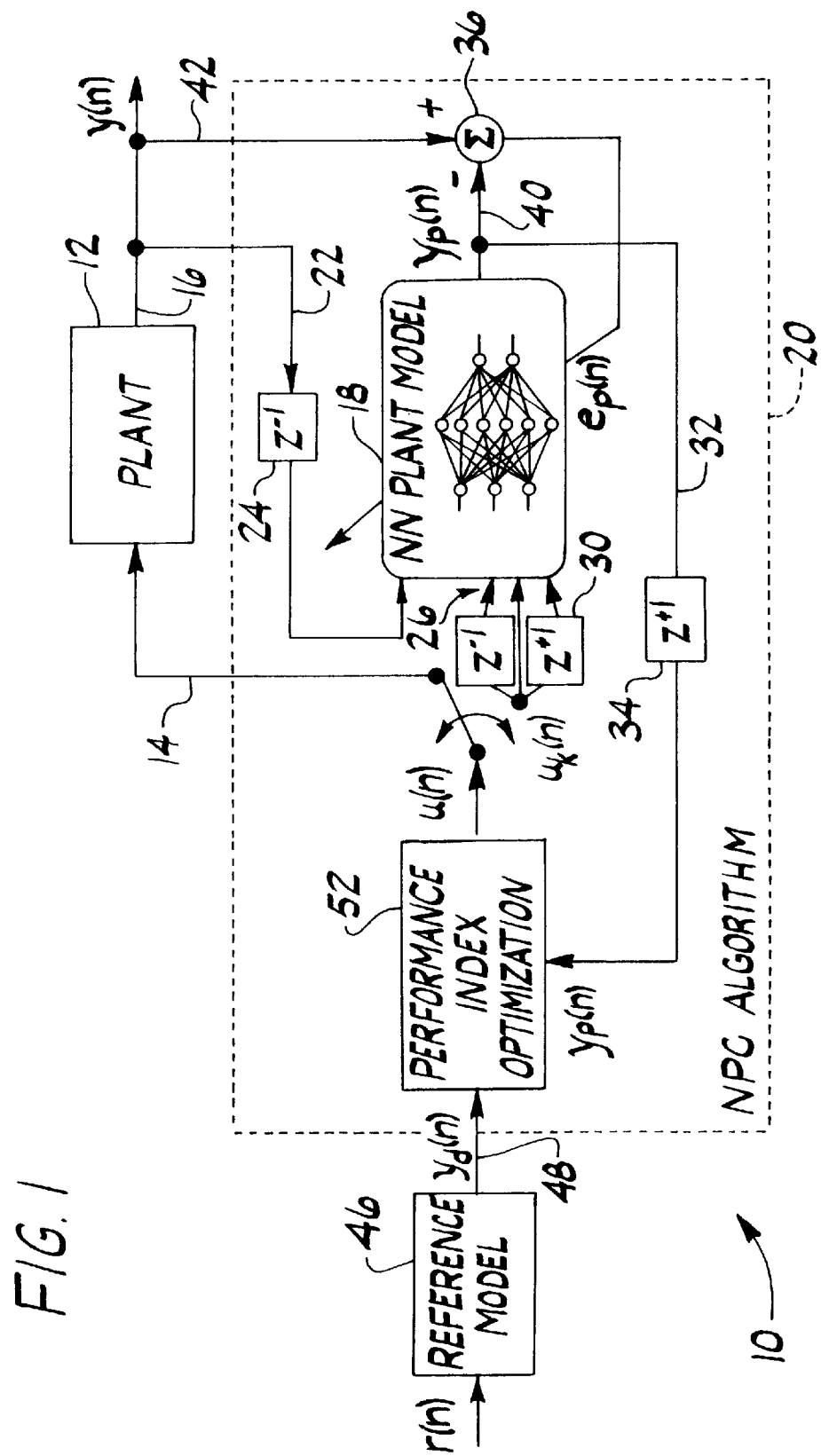
FIG. 1 is a block diagram of a neural predictive control system according to a preferred embodiment of the invention.

Referring now to FIG. 1, a neural predictive control (NPC) system, generally indicated at 10, provides adaptive control of a plant 12 for dynamic nonlinear applications (e.g., reducing vibrations and other undesirable responses associated with flexible structures). In this embodiment, the plant 12 represents the structure to be controlled by the system 10, such as an aircraft wing or tail, cantilever beam or hydraulic load. Plant 12 receives an input control signal via line 14 which actuates a response therein and outputs a signal via line 16 which is representative of its state resulting from the control input. According to the invention, NPC system 10 executes a predictive control scheme based on a neural network model 18 of plant 12 for predicting the future effect of a particular control input and for adjusting it to achieve a desired output response. A processor 20 (e.g., a personal computer with a 133 MHz Pentium® processor) executes the neural predictive control algorithm of NPC system 10.

In a preferred embodiment of the invention, system 10 provides model predictive control. In general, model predictive control refers to model-based control strategies which use the predicted future states of plant 12 as a means of determining the current control to be applied to plant 12. As will be described below, system 10 selects future controls to minimize a quadratic cost associated with the future states of plant 12.

In one preferred embodiment, plant 12 represents an aircraft wing (not shown) which is subject to undesirable aeroelastic responses and which has at least one actuator input and at least one feedback sensor output. For testing purposes, plant 12 may be modeled by a Benchmark Active Controls Technology (BACT) model (not shown) of an aircraft wing for which NPC system 10 provides active flutter suppression. As is known in the art, the BACT wing model includes a rigid wing attached to a flexible mount system. At a frequency of approximately 4–5 Hz, for example, such a wing model exhibits classical flutter phenomena which develops very gradually and can be easily extinguished with a mechanical snubber system. If the wing model's actuator is driven with, for example, uniform random excitation at the bandwidth of the anticipated control rate, the model vibrates.

Further to the example, the wing's trailing edge aileron (not shown) provides a control surface responsive to a control input u(n) and the wing's inboard trailing edge accelerometer (not shown) provides sensor feedback y(n) about the wing's state to neural network plant model 18. In another embodiment, the wing model also includes a pair of independently actuated upper and lower surface spoilers (not shown) which may be controlled by system 10. Although the present invention is described primarily with respect to flutter suppression for an aircraft wing, it is to be understood that NPC system 10 may be used to provide adaptive control for various dynamic systems. For example, control system 10 may be used for any vibration suppression related application such as a spacecraft flexible structure control, machining vibration suppression in lathes, mills, grinders, and the like, adaptive load alleviation for active flexible wing vehicles, adaptive control for aircraft stores to limit cycle oscillation, and active vibration suppression/isolation for rotorcraft, Canard Rotor/Wing vehicles, ships, and submarines. In addition, NPC system 10 may also be used for applications such as reconfigurable flight control systems, active flow control using synthetic jet actuators, precision pointing and hydraulic actuator load path following.

The neural network 18 which models plant 12 is a parallel information processing structure made up of interconnected processing units, or elements. The processing elements, also referred to as "neurons," each have a plurality of inputs which are processed through a network of weights and nonlinearities to produce a single output. As shown in FIG. 1, neural network plant model 18 receives the past sensor outputs from plant 12 via line 22. Neural network 18 also receives the past and present control inputs to plant 12. In turn, neural network 18 transforms these inputs, using its processing elements, into predictions regarding the future states of the plant sensor outputs which result from the control inputs.

Figure 2:
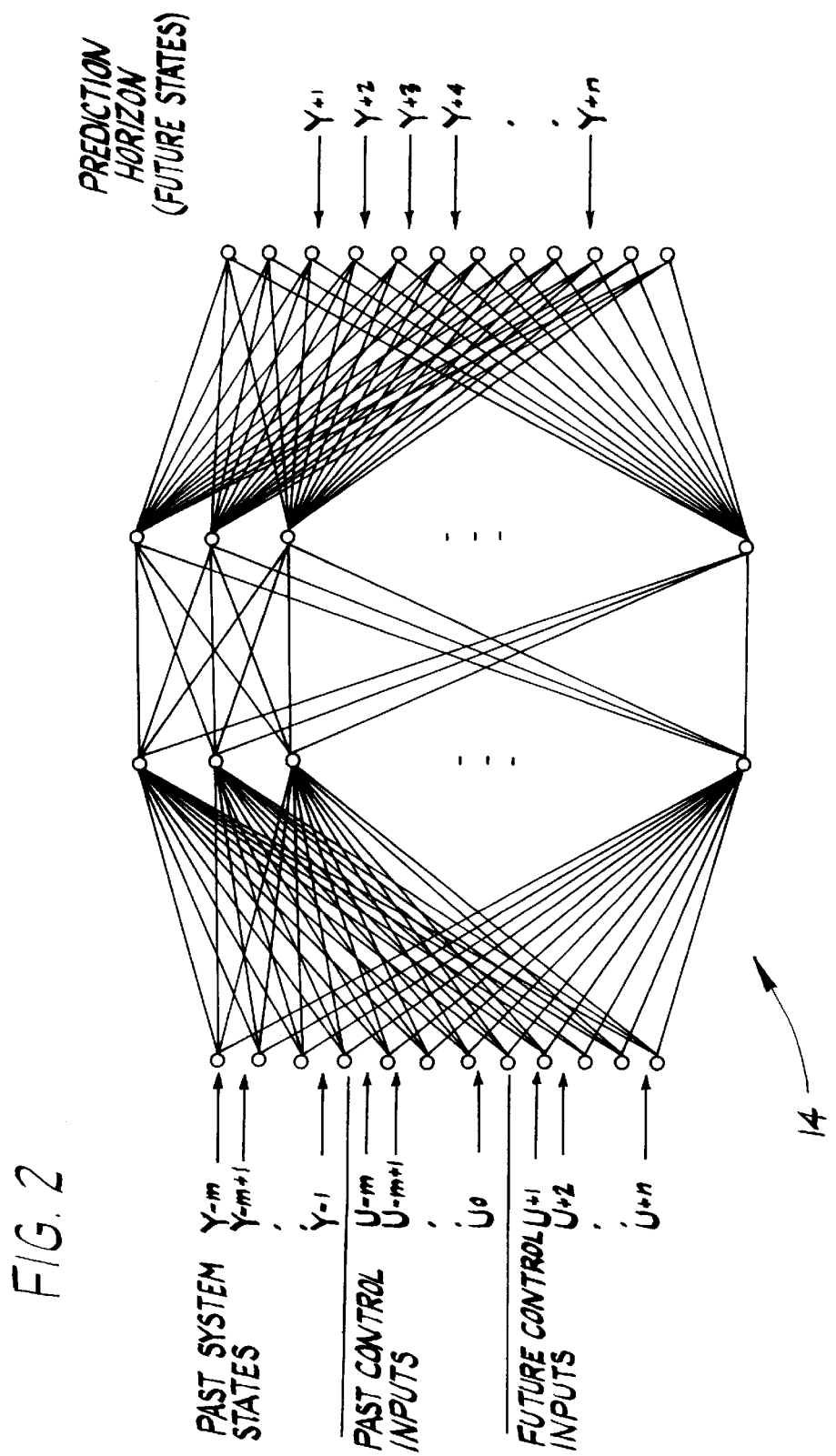
FIG. 2 is a schematic of a neural network of the system of FIG. 1.

FIG. 2 illustrates a general architecture or topology of neural network 18. Some connections between the processing elements have been omitted from FIG. 2 for clarity. In this embodiment, neural network 18 models the input/output dynamics of the plant 12 to be controlled and is trained with back propagation. This type of neural network 18, often referred to in the art as a multilayer perceptron, provides a relatively compact, universal approximator which is able to learn essentially any function to a desired degree of accuracy. The perceptron uses feedforward connections with a feedback learning rule. In other words, the perceptron uses error feedback to modify its learning parameters (i.e., the adaptive coefficients, or connection weights, which are associated with the input connections of its processing elements).

As shown in FIG. 2, neural network 18 preferably applies past states of the plant 12 outputs and past (and present) control inputs to plant 12 at discrete instances of time (e.g., every millisecond). Neural network 18 uses the past states and past controls together with a series of possible future control inputs to predict the future states of plant 12 resulting from the future control inputs. For most plants, NPC system 10 provides a satisfactory prediction horizon (i.e., future state predictions n time steps into the future) based on m=20 past plant states and past control inputs and n=15 future control inputs.

Conventional use of neural networks to model future system states involves feeding one predicted state output at each instance of time back into the neural network and then predicts another state output for the next instance in time. Such a recursive method of predicting future states, however, tends to increase prediction time and compound the error from each prediction with each iteration until the prediction itself becomes meaningless. In contrast, the architecture of neural network 18 according to the present invention provides a parallel processing arrangement including a future state prediction horizon for efficient computation without compounding errors. By using neural network 18 to model plant 12, system 10 may be applied to a wide variety of complex, nonlinear systems and is particularly well suited for active flutter suppression, buffet load alleviation, or any vibration suppession system.

Referring again to FIG. 1, system 10 first trains the neural network plant model 18 for use within its predictive control framework. System 10 receives sensor feedback y(n) from plant 12, digitizes it and then feeds it via line 32 into the inputs of neural network 18. The sensor output y(n) represents past state information and passes through a digital tapped-delay-line. In this embodiment, system 10 implements the tapped-delay-line in software with a stack, or array, of m past values of y(n) over the past m time steps. As shown in FIG. 1, a block 24 labeled $z^{-1}$ represents a memory for the development of the plant output history. The current and past controls u(n), as well as a vector series of proposed future control inputs $u_k(n)$, also feed into neural network 18 via line 26. As shown in FIG. 1, system 10 develops a trial control input horizon, as represented by a block 30 labeled $z^{+1}$, for n future time steps. The trial control input for the first iteration may be set to any value within the normal range of possible actuator control signals. Neural network 18 models the future effect of this input by projecting it n time steps into the future, where each different step is represented by a different output of neural network 18. Neural network 18 predicts a future output $y_p$ (n) based on the values of control inputs u(n), plant outputs y(n) and trial inputs $u_k$ (n). Via line 32, system 10 develops the future prediction horizon of $y_p$ (n), as represented by a block 34 labeled $z^{+1}$, for n future time steps. The n steps into the future form the prediction horizon and n ranges between, for example, 1 and 20 time steps. Preferably, the modes of plant 12 and the desired control rate determine the value of n. At a control rate of 200 Hz, for example, n=15 provides a satisfactory prediction horizon for controlling vibration with a resonant frequency at 5 Hz and 20 Hz.

As described above, neural network 18 modifies its learning parameters, or weights, as a function of error feedback. A summing function, indicated at reference character 36, compares the predicted output $y_p$ (n) from network 18 via line 40 to the actual sensor output y(n) from plant 12 via line 42. The summing function 36 calculates an error $e_p$ (n) between the two outputs and back propagates it via line 38 through neural network 18 to modify the learning parameters of the network 18.

In a preferred embodiment of the invention, a reference model 46 of NPC system 10 provides a reference trajectory $y_d$ (n) via line 48. The reference trajectory represents the desired future output of plant 12. As an example, $y_d$ (n)=0 for wing flutter suppression. System 10 executes a performance index optimization routine 52 on the horizon for evaluating the predicted performance of the trial input value to achieve the desired reference trajectory. In this embodiment, the performance index is a cost function of the future predictions of neural network model 18, the derivatives of the future predictions and the magnitude of the proposed control signal. For example, if the future predictions represent a wing position, then the derivatives represent velocity. Preferably, each of the parameters of the cost function is weighted to form a cost performance index tailored to a particular system. Specifically:

$$C = \sum_{i=1}^{n} (G_p * Y_i^2 + G_v * \dot{Y}_i^2 + G_I * u_2) * W^i$$

where:
C=cost of the selected input (u), i=horizon index, n=horizon window, $G_p$=position gain, $Y_i$=predicted state of the plant at horizon i, $G_v$=velocity gain, $G_I$=input gain, $W^i$=future state weighting factor.

The gains $G_p$ and $G_v$ control the weighting placed on minimizing the variance of the position and the velocity, respectively, of plant 12. Both parameters vary in range between zero and one and, in most cases, one parameter is set to one and the other is set to zero. Without input weighting (i.e., $G_I$=0), system 10 operates as a simple minimum-variance controller which may result in an unstable system. For this reason, a preferred value for $G_I$ is non-zero (e.g., $0<G_I<1$ $e^{-3}$) which causes the cost function to satisfy the opposing goals of minimizing the variance of both the position and velocity of plant 12 while reducing the amount of control authority available to accomplish this goal. The weighting value $W^i$ controls the amount of emphasis placed on future states as a function of how many time steps ahead are being considered because more remote future states may be less reliable than those nearer in time. This parameter also provides a positive effect on stability. As an example, $W^i$ is approximately 1.0.

System 10 repeatedly predicts the future plant output and evaluates the trial input value with the optimization routine until the desired performance, or iteration limit is achieved. System 10 then outputs the trial control value selected by the optimization process to plant 12 via line 14. As an example, Intel's Electronically Trainable Analog Neural Network (ETANN) chip is suitable for implementing the neural network model 18 of plant 12 and evaluate the performance, or cost, index at block 52.

In conventional linear predictive control schemes, an entire series of optimal future controls is solved for analytically and only the most recent one is used. Although this approach, known as a receding horizon, is useful for linear systems, it is both slow and unable to work on nonlinear systems. Advantageously, system 10 is broadly applicable for controlling nonlinear plants. According to the invention, system 10 presents a comprehensive set of possible control inputs, referred to as a control horizon, to neural network 18 and selects the input for the first iteration from the set which yields the lowest cost. By searching for the control input which provides the lowest performance index (i.e., cost), system 10 provides predictive control for different plants without regard to their complexity.

By setting all future inputs to the same value, system 10 makes searching for the desired control input both possible and independent of any plant information. The assumption about the future outputs being of the same value approaches truth when the ratio of control rate (e.g., 1000 Hz) to modal frequency (e.g., 5 or 20 Hz) is relatively large. For even faster solution times, a rough search is done to determine an approximate control input value, and then is refined.

In a preferred embodiment of the invention, system 10 approximates the performance index by assuming a nearly linear response for certain plants when a relatively small time span is examined. In other words, a small bracket around an approximate control point is assumed to be linear. By recording the cost of each instance when three control signals within the bracket are input to the model one at a time and then fitting the data to a quadratic function which is solved for its minimum value, system 10 obtains a linear one-dimensional solution. Appendix A provides a derivation of the approximating quadratic solution of the cost function in the linear region. In general, the cost function in this region may be plotted as an approximately parabolic curve with the control inputs I being plotted on the x-axis and the resultant cost C plotted on the y-axis. The equations of Appendix A provide parameters which define an approximate shape and location of the curve based on three control inputs. System 10 then solves for the lowest point on the curve (i.e., the control input which yields the lowest cost). Moreover, the linear version of these equations can be solved even faster by preselecting the three control inputs (e.g., $x_1$=−10, $x_2$=0; $x_3$=−10) and simplifying the equations prior to feeding the predicted future state information into the performance index equation.

It is also contemplated that neural network 18 and optimization routine 52 be implemented on more than one processor 20. In this embodiment, multiple neural networks may be used for parallel prediction to reduce computer cycle time. For example, a neural network implemented on one processor 20 could be used for processing half of the possible trial control inputs and a neural network implemented on another processor 20 could be used for processing the other half of the possible trial control inputs.

As described herein, the present invention provides a direct method for adapting control system 10. In this regard, neural network model 18 may be trained online.

If online learning is engaged, system 10 updates the neural network weights using a set of input/output data and an appropriate training algorithm. System 10 repeats the entire process for each control cycle.

Figure 3:
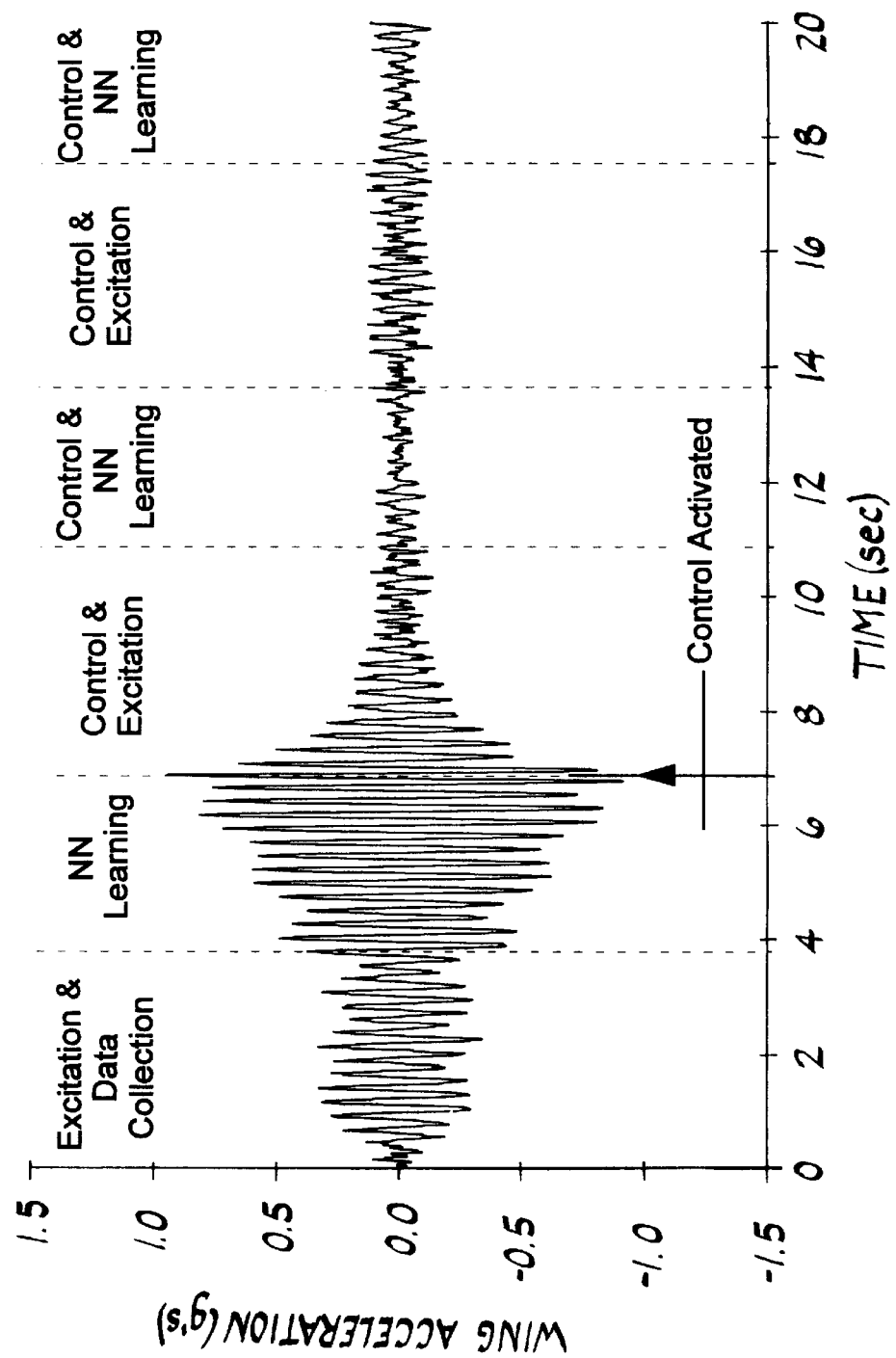
FIG. 3 is an exemplary illustration of simultaneous controlling and modeling of a plant by the system of FIG. 1.

According to the invention, system 10 provides predictive control simultaneously with the training of neural network 18. FIG. 3 is an exemplary plot which illustrates adaptive control of plant 12 in which training and predictive control occur together. Starting with an untrained network 18, a white noise excitation signal is sent to plant 12 for four seconds, providing 400 data points for learning by neural network 18. In this example, learning then occurs during the next 2.7 seconds, allowing control to be activated at about 6.7 seconds. As shown in FIG. 3, the plant vibration grows steadily until control system 10 initiates stabilization. Once system 10 activates its performance optimization routine 52, learning and control occur simultaneously, allowing model updates to occur every 6.7 seconds. The speed of the processor(s) 20, the control cycle rate, and the amount of data needed for accurate plant modeling determine the length of this time interval (e.g., processor 20 is embodied by a 133 MHz Pentium® processor running at 2500 Hz). The optimum settings for the level of excitation, the amount of data needed for learning, and the performance index used by the system optimization loop is plant dependent.

As described above, system 10 may be used for active flutter suppression of a wing. If plant 12 embodies a wing model having a trailing edge aileron and an inboard trailing edge accelerometer, system 10 self-configures through online learning for single input/single output control using the trailing edge aileron as an actuator input and the inboard trailing edge accelerometer as a sensor output.

It is contemplated that flutter suppression control may combine adaptive learning with fixed gain control. For example, after system 10 generates the neural network model 18 online, it turns off learning which freezes the weights of network 18. As trained, network 18 may then be used in system 10 until dynamic pressure changes significantly and a new model is required to optimize control performance.

Advantageously, the present invention provides control of structural vibration suppression problems. Other implementations of neural network-based controllers have been applied to "slower" chemical processing systems with less complicated dynamics such as autoclave composite curing and pH control in neutralization reactors. In this embodiment, system 10 solves several problems relating to real-time optimization, prediction performance, and cost function tuning for stability. The specific neural network architecture design used to predict multiple intervals in the future, without using a recurrent network, beneficially achieves stable operation of the control system 10.

It is contemplated that the present invention may be utilized with, for example, a smart structure wing having distributed piezoelectric actuators and sensors. Adaptive neural network based control is considered to be an enabling technology for both lightweight flexible wing structures and reconfigurable control systems which will provide extended aircraft life, reduced acquisition costs, and reduced operation and support costs for future aerospace systems.

Implementation of smart structure technologies for alleviating undesirable vibration and aeroelastic response associated with highly flexible structures, which include neural networks, fiber optics, and adaptive materials, will enable future aircraft to be more lightweight and flexible, thereby increasing affordability. Artificial neural networks, which possess effective large scale parallel processing and adaptation capabilities, are extremely attractive for implementing the "brain" of a smart structure. Adaptive control can reduce aeroelastic response associated with buffet and atmospheric turbulence, it can increase flutter margins, and it may be able to reduce response associated with nonlinear phenomenon like limit cycle oscillations. By reducing vibration levels and loads, aircraft structures can have lower acquisition cost, reduced maintenance, and extended lifetimes.

As compared to conventional controllers, such as those employing PID or pole placement control methods, the present invention combines the benefits of relatively easy implementation with improved control performance. The advantages of neural control over conventional control techniques include a simpler and more cost effective design methodology as well as the capability to learn online the time varying nature of a system due to wear, loss of actuators, or other causes.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A $$y_1 = ax_1^2 + bx_1 + c \tag{1}$$

$$y_2 = ax_2^2 + bx_2 + c \tag{2}$$

$$y_3 = ax_3^2 + bx_3 + c \tag{3}$$

Subtracting $y_2$ from $y_1$ and $y_3$ from $y_2$ yields:

$$y_1 - y_2 = a(x_1^2 - x_2^2) + b(x_1 - x_2) \tag{4}$$

$$y_2 - y_3 = a(x_2^2 - x_3^2) + b(x_2 - x_3) \tag{5}$$

Solving equation (4) for "$a$" yields:

$$a = \frac{-(y_1 - y_2 - bx_1 + bx_2)}{(-x_1^2 + x_2^2)} \tag{6}$$

Substituting into equation (5) yields:

$$y_2 - y_3 = \frac{(-y_1 + y_2 + bx_1 - bx_2)}{(-x_1^2 + x_2^2)}(x_2^2 - x_3^2) + b(x_2 - x_3) \tag{7}$$

Solving equation (7) for "$b$" yields:

$$b = \frac{-\left[y_2 - y_3 + \frac{1}{(-x_1^2 + x_2^2)}y_1 x_2^2 - \frac{1}{(-x_1^2 + x_2^2)}y_1 x_3^2 - \frac{1}{(-x_1^2 + x_2^2)}y_2 x_2^2 - \frac{1}{(-x_1^2 + x_2^2)}y_2 x_3^2\right]}{\left[\frac{-1}{(-x_1^2 + x_2^2)}x_1 x_2^2 + \frac{1}{(-x_1^2 + x_2^2)}x_1 x_3^2 + \frac{1}{(-x_1^2 + x_2^2)}x_2^3 - \frac{1}{(-x_1^2 + x_2^2)}x_2 x_3^2 - x_2 + x_3\right]}$$

Simplifying yields:

$$b = \frac{(-y_2 x_1^2 + y_3 x_1^2 - y_3 x_2^2 + y_1 x_2^2 - y_1 x_3^2 + y_2 x_3^2)}{(x_1 x_2^2 - x_1 x_3^2 + x_2 x_3^2 - x_2 x_1^2 - x_3 x_1^2 - x_3 x_2^2)}$$

-continued

Once "b" is solved for, "a" is solved for in equation (6).

Solving for "c" yields:

$$c = y_1 - ax_1^2 - bx_1$$

To solve for the minimum or optimal value of $x$ is then:

$$y = ax^2 + bx + c$$

Differentiating on $x$ yields:

$$0 = 2ax + b$$

Solving for $x$ yields:

$$x = \frac{-b}{2a}$$

What is claimed is:

1. A method of controlling a dynamic nonlinear plant, said plant receiving an input control signal for controlling the plant and generating an output signal representative of a state of the plant in response to the received input control signal, said method comprising the steps of:
   storing the input control and output signals corresponding to m consecutive past states of the plant over m time steps into the past;
   generating a set of trial control inputs, said trial control inputs being representative of the input control signal corresponding to the next n consecutive future states of the plant over n time steps into the future;
   predicting a set of future output states n time steps into the future for each trial control input with a computer neural network having a parallel processing arrangement, said future output states being representative of the output signal corresponding to the next n consecutive future states of the plant over n time steps into the future in response to the trial control inputs, said neural network predicting the future output states based on the past input and output signals and the future trial control inputs without using a recurrent network;
   determining a performance index as a function of the future output states, said performance index being indicative of plant performance over time in response to the trial control inputs; and
   modifying the input control signal as a function of the trial control inputs for controlling the plant so that the performance index reaches a desired value.

2. The method of claim 1 wherein the step of modifying the input control signal comprises the steps of:
   modifying the trial control inputs based on the performance index;
   predicting another set of future output states n time steps into the future with the neural network, said future output states of the other set of future output states being representative of the output signal for the next n consecutive future states of the plant over n time steps into the future in response to the modified trial control inputs, said neural network predicting the other set of future output states based on the past input and output signals and the modified future trial control inputs without using a recurrent network;
   determining the performance index as a function of the other set of future output states, said performance index being indicative of plant performance over time in response to the modified trial control inputs; and
   repeating the steps of modifying the trial control inputs, generating the other set of future output states and determining the performance index until the desired performance index is reached.

3. The method of claim 1 wherein each of the trial control inputs has a signal level representative of the input control signal corresponding to the next n consecutive future states of the plant and further comprising the step of setting the signal levels of the trial control inputs equal to each other for each iteration.

4. The method of claim 1 further comprising the steps of generating an error signal as a function of the difference between the predicted future output states and the output signal and feeding the error back into the neural network.

5. The method of claim 1 wherein the performance index is a cost function.

6. The method of claim 1 wherein the step of determining the performance index includes calculating the following cost function:

$$C = \sum_{i=1}^{n} \left( G_p * Y_i^2 + G_v * \dot{Y}_i^2 + G_I * u_2 \right) * W^i$$

where:
   C=cost of a selected trial control input (u),
   i=horizon index, n=horizon window, $G_p$=position gain,
   $Y_i$=predicted future output state of the plant at horizon i, $G_v$=velocity gain, $G_I$=input gain, $W^i$=future state weighting factor.

7. The method of claim 1 wherein the plant includes an actuator for controlling the plant as a function of the input control signal.

8. The method of claim 7 wherein the plant comprises an aircraft wing and the actuator controls the wing for flutter suppression.

9. The method of claim 1 wherein n defines a horizon window representing a plurality of time steps into the future.

10. A system for controlling a dynamic nonlinear plant, said plant receiving an input control signal for controlling the plant and generating an output signal representative of a state of the plant in response to the received input control signal, said system comprising:
   a memory storing the input and output signals corresponding to m consecutive past states of the plant over m time steps into the past;
   a non-recurrent computer neural network having a parallel processing arrangement, said neural network being responsive to a set of trial control inputs for predicting a set of future output states n time steps into the future for each trial control input, said future output states being representative of the output signal corresponding to the next n consecutive future states of the plant over n time steps into the future in response to the trial control inputs, said trial control inputs being representative of the input control signal corresponding to the next n consecutive future states of the plant over n time steps into the future, said neural network predicting the future output states based on the past input and output signals and the future trial control inputs; and
   a processor for generating the input control signal for controlling the plant, said processor:
      generating the trial control inputs;
      determining a performance index as a function of the future output states, said performance index being indicative of plant performance over time in response to the trial control inputs; and modifying the input control signal as a function of the trial control inputs for controlling the plant so that the performance index reaches a desired value.

11. The system of claim 10 wherein the neural network predicts another set of future output states n time steps into the future, said future output states of the other set of future output states being representative of the output signal for the next n consecutive future states of the plant over n time steps into the future, in response to the modified trial control inputs, said neural network predicting the other set of future output states based on the past input and output signals and the modified future trial control inputs, and wherein the processor determines the performance index as a function of the other set of future output states, said performance index being indicative of plant performance over time in response to the modified trial control inputs.

12. The system of claim 10 wherein each of the trial control inputs has a signal level representative of the input control signal corresponding to the next n consecutive future states of the plant and wherein the signal levels of the trial control inputs are equal to each other for each iteration.

13. The system of claim 10 further comprising a summing function for generating an error signal as a function of the difference between the predicted future output states and the output signal and a feedback loop for feeding the error back into the neural network.

14. The system of claim 10 wherein the performance index is a cost function.

15. The system of claim 10 wherein the performance index is calculated according to the following cost function:

$$C = \sum_{i=1}^{n} \left(G_p * Y_i^2 + G_v * \dot{Y}_i^2 + G_I * u_2\right) * W^i$$

where:
C=cost of a selected trial control input (u),
i=horizon index, n=horizon window, $G_p$=position gain, $Y_i$=predicted future output state of the plant at horizon i, $G_v$=velocity gain, $G_I$=input gain, $W^i$=future state weighting factor.

16. The system of claim 10 wherein the plant includes an actuator for controlling the plant as a function of the input control signal.

17. The method of claim 16 wherein the plant comprises an aircraft wing and the actuator controls the wing for flutter suppression.

18. The system of claim 10 wherein n defines a horizon window representing a plurality of time steps into the future.

19. A neural network predictive control system for suppressing structural vibration in a plant, said plant receiving an input control signal for controlling the plant and generating an output signal representative of a state of the plant in response to the received input control signal, said system comprising:

a memory storing the input and output signals corresponding to m consecutive past states of the plant over m time steps into the past;

a non-recurrent computer neural network having a parallel processing arrangement, said neural network being responsive to a set of trial control inputs for predicting a set of future output states n time steps into the future for each trial control input, said future output states being representative of the output signal corresponding to the next n consecutive future states of the plant over n time steps into the future in response to the trial control inputs, said trial control inputs being representative of the input control signal corresponding to the next n consecutive future states of the plant over n time steps into the future, said neural network predicting the future output states based on the past input and output signals and the future trial control inputs; and a processor for generating the input control signal for controlling the plant, said processor:
generating the trial control inputs;
determining a performance index as a function of the future output states, said performance index being indicative of plant performance over time in response to the trial control inputs; and
modifying the input control signal as a function of the trial control inputs for controlling the plant so that the performance index reaches a desired value.

20. The system of claim 19 wherein the plant comprises an aircraft wing and wherein the plant includes an actuator for suppressing vibration in the wing as a finction of the input control signal.

* * * * *